United States Patent
Lee

(10) Patent No.: US 10,211,764 B2
(45) Date of Patent: Feb. 19, 2019

(54) SHORT-CIRCUIT DETECTION CIRCUIT IN A FULL-BRIDGE CIRCUIT

(71) Applicant: PRINCETON TECHNOLOGY CORPORATION, New Taipei (TW)

(72) Inventor: Wen-Jan Lee, New Taipei (TW)

(73) Assignee: PRINCETON TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 15/470,056

(22) Filed: Mar. 27, 2017

(65) Prior Publication Data
US 2018/0183364 A1    Jun. 28, 2018

(30) Foreign Application Priority Data

Dec. 28, 2016   (TW) .............................. 105143517 A

(51) Int. Cl.
*H02H 9/00* (2006.01)
*H03K 17/082* (2006.01)
(Continued)

(52) U.S. Cl.
CPC .............. *H02P 6/085* (2013.01); *H02H 3/08* (2013.01); *H02H 7/0853* (2013.01);
(Continued)

(58) Field of Classification Search
CPC ... H03K 17/0822; G11B 19/28; H02P 7/0044; H02H 3/093
See application file for complete search history.

(56) References Cited

U.S. PATENT DOCUMENTS

| 7,102,320 B1* | 9/2006 | Haman | H02P 7/04 |
| | | | 318/400.26 |
| 2005/0067986 A1* | 3/2005 | Kurosawa | G11B 19/28 |
| | | | 318/400.35 |

(Continued)

FOREIGN PATENT DOCUMENTS

JP    H10-257779    9/1998

OTHER PUBLICATIONS

Japanese Patent Office. Office Action. dated Dec. 4, 2018. 2 pages. With English translation (5 pages).

*Primary Examiner* — Kawing Chan
*Assistant Examiner* — Cortez Cook
(74) *Attorney, Agent, or Firm* — Muncy, Geissler, Olds & Lowe, P.C.

(57) ABSTRACT

A short-circuit detection circuit is adapted to a full-bridge driver which includes the first and second high-side transistors respectively coupled from a supply voltage to the first and second output nodes and the first and second low-side transistors respectively coupled from the first and second output nodes to a ground. The short-circuit detection circuit includes the first and second voltage dividers respectively receiving voltages of the first and second output nodes to respectively generate the first and second voltages, the high-side and low-side selectors respectively selecting the first voltage and the second voltage to respectively generate a high-side voltage and a low-side voltage, a high-side comparator generating a high-side short-circuit signal when the high-side voltage is lower than a high-side reference voltage, and a low-side comparator generating a low-side short-circuit signal when the low-side voltage exceeds the low-side reference voltage.

12 Claims, 3 Drawing Sheets

(51) Int. Cl.
*G11B 19/28* (2006.01)
*H02P 1/00* (2006.01)
*H02P 6/08* (2016.01)
*H02P 7/03* (2016.01)
*H02H 9/02* (2006.01)
*H02H 7/085* (2006.01)
*H02H 3/08* (2006.01)
*H02P 29/024* (2016.01)

(52) U.S. Cl.
CPC .............. *H02H 9/005* (2013.01); *H02H 9/02* (2013.01); *H02P 7/04* (2016.02); *H02P 29/027* (2013.01)

(56) References Cited

U.S. PATENT DOCUMENTS

2009/0195205 A1* 8/2009 Ide .................... G01R 31/1227
  318/490
2011/0298443 A1* 12/2011 Kanemitsu ......... H03K 17/0822
  323/299

* cited by examiner

SHORT-CIRCUIT DETECTION CIRCUIT IN A FULL-BRIDGE CIRCUIT

CROSS REFERENCE TO RELATED APPLICATIONS

This Application claims priority of Taiwan Patent Application No. 105143517, filed on Dec. 28, 2016, the entirety of which is incorporated by reference herein.

BACKGROUND OF THE INVENTION

Field of the Invention

The disclosure relates generally to a short-circuit detecting circuit adapted in a full-bridge circuit.

Description of the Related Art

A full-bridge circuit is usually adapted in driving a brushed motor or a stepper motor. FIG. 1 shows a schematic diagram of a full-bridge driving circuit. As shown in FIG. 1, the full-bridge driving circuit 100 includes a first high-side transistor HSM1, a second high-side transistor HSM2, a first low-side transistor LSM1, a second low-side transistor LSM2, and a motor coil MC.

The first high-side transistor HSM1 is coupled between the supply voltage VS and the first output node NO1. The second high-side transistor HSM2 is coupled between the supply voltage VS and the second output node NO2. The first low-side transistor LSM1 is coupled between the first output node NO1 and the ground. The second low-side transistor LSM2 is coupled between the second output node NO2 and the ground. The motor coil MC is coupled between the first output node NO1 and the second output node NO2.

In this configuration, there are three possible risks of a short-circuit occurring during the operation of the circuit: the motor coil MC could be short-circuited; the supply voltage VS could be short-circuited to the first output node NO1 or the second output node NO2; and the ground could be short-circuited to the first output node NO1 or the second output node NO2. Therefore, a mechanism for short-circuit protection is required. Otherwise, the first high-side transistor HSM1, the second high-side transistor HSM2, the first low-side transistor LSM1, and the second low-side transistor LSM2 may burn out due to the large current caused by a short-circuit.

BRIEF SUMMARY OF THE INVENTION

In an embodiment, a short-circuit detection circuit adapted in a fill-bridge driving circuit is provided. The full-bridge driving circuit comprises a first high-side transistor coupled between a supply voltage and a first output node, a second high-side transistor coupled between the supply voltage and a second output node, a first low-side transistor coupled between the first output node and a ground, a second low-side transistor coupled between the second output node and the ground, and a motor coil coupled between the first output node and the second output node. The short-circuit detection circuit comprises: a first voltage divider, a second voltage divider, a high-side selector, a high-side comparator, a low-side selector, and a low-side comparator. The first voltage divider receives a voltage of the first output node to generate a first voltage. The second voltage divider receives a voltage of the second output node to generate a second voltage. The high-side selector selects the first voltage or the second voltage to generate a high-side voltage. The high-side comparator generates a high-side short-circuit signal when the high-side voltage is less than a high-side reference voltage. The low-side selector selects the first voltage or the second voltage to generate a low-side voltage. The low-side comparator generates a low-side short-circuit signal when the low-side voltage exceeds a low-side reference voltage.

According to an embodiment of the invention, the first voltage divider comprises a first resistor and a second resistor, in which the first resistor is coupled between the first output node and the first voltage, and the second resistor is coupled between the first voltage and the ground. The second voltage divider comprises a third resistor and a fourth resistor, in which the third resistor is coupled between the second output node and the second voltage, and the fourth resistor is coupled between the second voltage and the ground.

According to an embodiment of the invention, the first high-side transistor is turned ON according to a first high-side driving signal, and the second high-side transistor is turned ON according to a second high-side driving signal. The high-side selector, according to the first high-side driving signal, selects the voltage of the first output node to be the first high-side voltage, and the high-side selector, according to the second high-side driving signal, selects the voltage of the second output node to be the high-side voltage.

According to an embodiment of the invention, the first low-side transistor is turned ON according to a first low-side driving signal, and the second low-side transistor is turned ON according to a second low-side driving signal. The low-side selector, according to the first low-side driving signal, selects the voltage of the first output node to be the low-side voltage, and the low-side selector, according to the second low-side driving signal, selects the voltage of the second output node to be the low-side voltage.

According to an embodiment of the invention, the short-circuit detection circuit further comprises an alarm-generating circuit. The alarm-generating circuit generates an alarm signal when the high-side short-circuit signal or the low-side short-circuit signal is received.

According to an embodiment of the invention, when the motor coil is short-circuited, the alarm-generating circuit receives the high-side short-circuit signal or the low-side short-circuit signal to generate the alarm signal. When the motor coil is short-circuited to the supply voltage, the alarm-generating circuit receives the low-side short-circuit signal to generate the alarm signal. When the motor coil is short-circuited to the ground, the alarm-generating circuit receives the high-side short-circuit signal to generate the alarm signal.

In another embodiment, a full-bridge circuit comprises a full-bridge driving circuit and a short-circuit detection circuit. The full-bridge driving circuit comprises: a first high-side transistor, a second high-side transistor, a first low-side transistor, a second low-side transistor, and a motor coil. The first high-side transistor is coupled between a supply voltage and a first output node. The second high-side transistor is coupled between the supply voltage and a second output node. The first low-side transistor is coupled between the first output node and a ground. The second low-side transistor is coupled between the second output node and the ground. The motor coil is coupled between the first output node and the second output node. The short-circuit detection circuit comprises: a first voltage divider, a second voltage divider, a high-side selector, a high-side comparator, a low-side selector, and a low-side comparator. The first voltage divider receives the voltage of the first output node to generate a first voltage. The second voltage divider receives the voltage of the second output node to generate a second voltage. The high-side selector selects the first voltage or the second voltage to generate a high-side voltage. The high-side comparator generates a high-side short-circuit signal when the high-side voltage is less than a high-side reference voltage. The low-side selector selects the first voltage or the second voltage to generate a low-side voltage. The low-side comparator generates a low-side short-circuit signal when the low-side voltage exceeds a low-side reference voltage.

According to an embodiment of the invention, the first voltage divider comprises a first resistor and a second resistor, in which the first resistor is coupled between the first output node and the first voltage, and the second resistor is coupled to the first voltage and the ground. The second voltage divider comprises a third resistor and a fourth resistor, in which the third resistor is coupled between the second output node and the second voltage, and the fourth resistor is coupled between the second voltage and the ground.

According to an embodiment of the invention, the first high-side transistor is turned ON according to a first high-side driving signal, and the second high-side transistor is turned ON according to a second high-side driving signal. The high-side selector, according to the first high-side driving signal, selects a voltage of the first output node to be the high-side voltage, and the high-side selector, according to the second high-side driving signal, selects the voltage of the second output node to be the high-side voltage.

According to an embodiment of the invention, the first low-side transistor is turned ON according to a first low-side driving signal, and the second low-side transistor is turned ON according to a second low-side driving signal. The low-side selector, according to the first low-side driving signal, selects the voltage of the first output node to be the low-side voltage, and the low-side selector, according to the second low-side driving signal, selects the voltage of the second output node to be the low-side voltage.

According to an embodiment of the invention, the short-circuit detection circuit further comprises an alarm-generating circuit. The alarm-generating circuit generates an alarm signal when receiving the high-side short-circuit signal or the low-side short-circuit signal.

According to an embodiment of the invention, when the motor coil is short-circuited, the alarm-generating circuit receives the high-side short-circuit signal or the low-side short-circuit signal to generate the alarm signal. When the motor coil is short-circuited to the supply voltage, the alarm-generating circuit receives the low-side short-circuit signal to generate the alarm signal. When the motor coil is short-circuited to the ground, the alarm-generating circuit receives the high-side short-circuit signal to generate the alarm signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
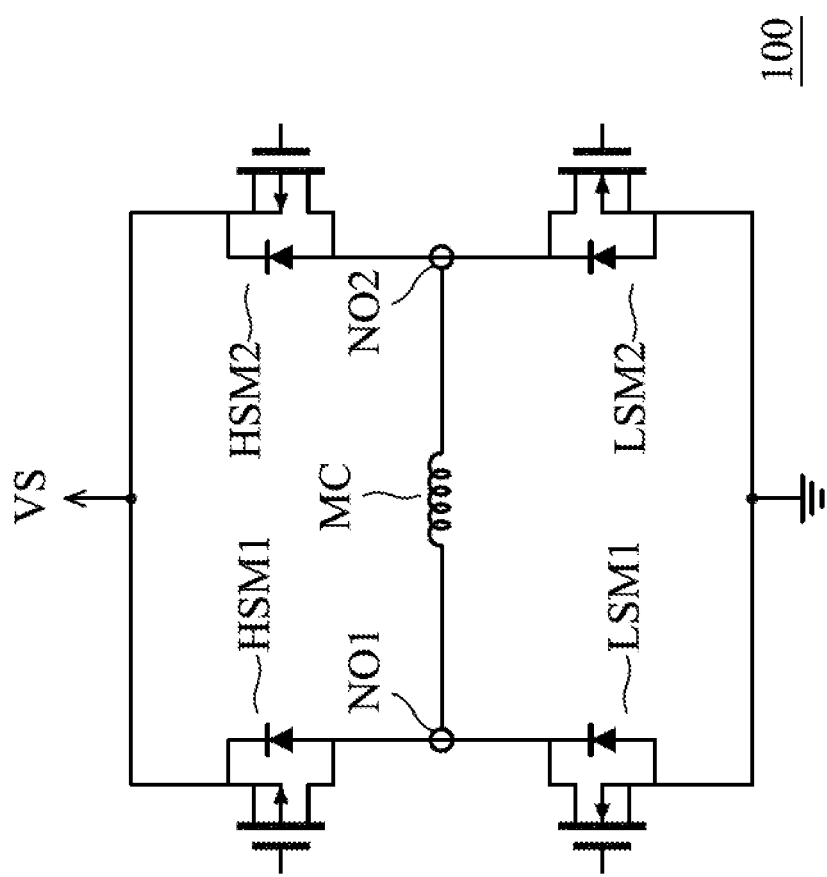
FIG. 1 is a schematic diagram of a full-bridge driving circuit.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 2:
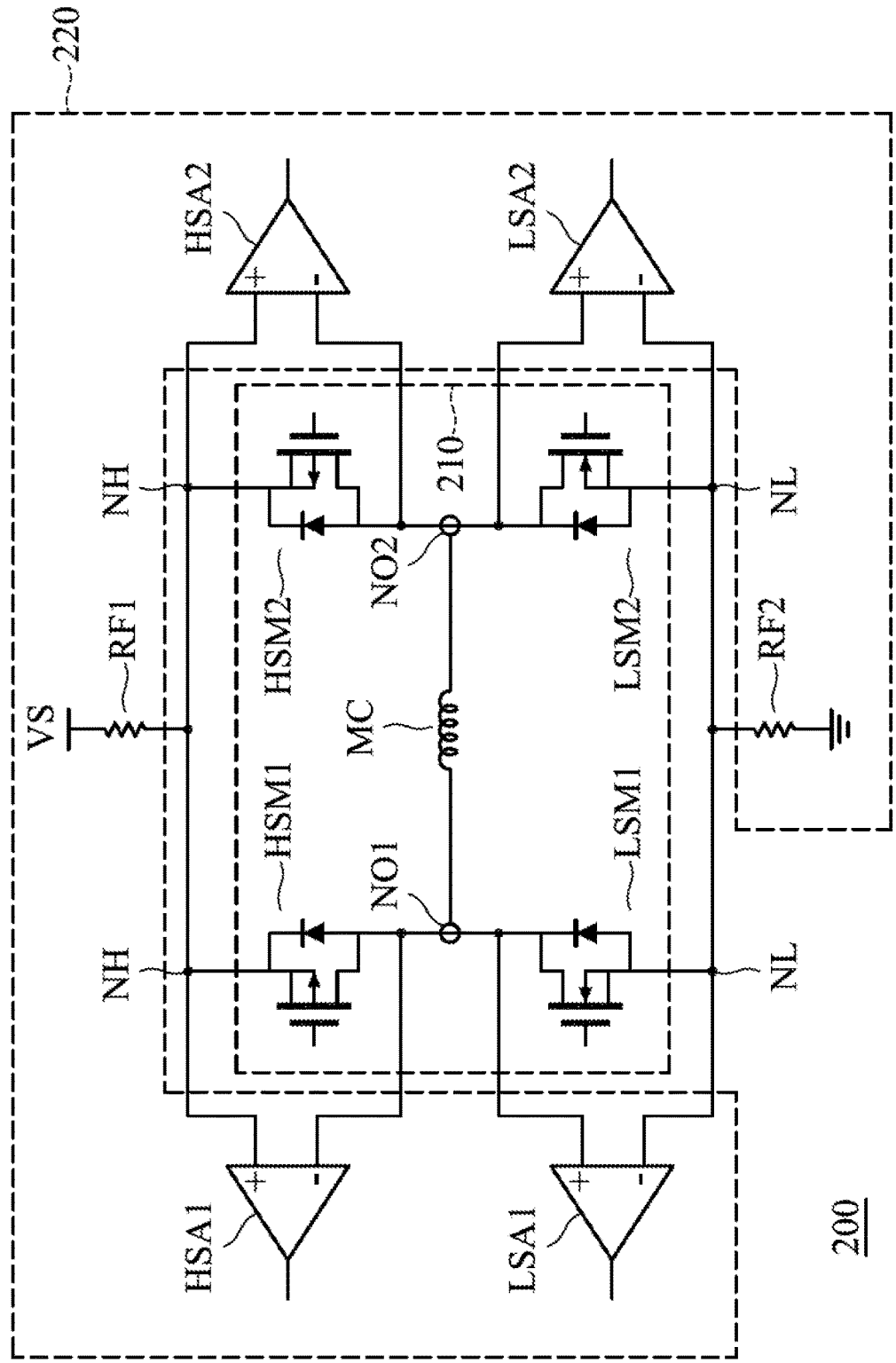
FIG. 2 is a schematic diagram of a full-bridge circuit in accordance with an embodiment of the invention.

FIG. 2 is a schematic diagram of a full-bridge circuit in accordance with an embodiment of the invention. As shown in FIG. 2, the full-bridge circuit 200 includes a full-bridge driving circuit 210 and a short-circuit detection circuit 220. The full-bridge driving circuit 210 is identical to the full-bridge driving circuit of FIG. 1, which includes the first high-side transistor HSM1, a second high-side transistor HSM2, a first low-side transistor LSM1, a second low-side transistor LSM2, and a motor coil MS. The full-bridge driving circuit 210 is coupled between the high-voltage node NH and the low-voltage node NL.

The short-circuit detection circuit 210 includes a first current-detecting resistor RF1, a second current-detecting resistor RF2, a first high-side amplifier HSA1, a second high-side amplifier HSA2, a first low-side amplifier LSA1, and a second low-side amplifier LSA2. The first current-detecting resistor RF1 is coupled between the supply voltage VS and the high-voltage node NH, which is configured to detect the current flowing from the supply voltage VS to the full-bridge driving circuit 210. The second current-detecting resistor RF2 is coupled between the low-voltage node NL and the ground, which is configured to detect the current flowing from the full-bridge driving circuit 210 to the ground.

According to an embodiment of the invention, the first high-side amplifier HSA1 receives the voltage of the high-voltage node NH and the voltage of the first output node NO1, which is configured to detect the current of the first high-side transistor HSM1. The second high-side amplifier HSA2 receives the voltage of the high-voltage node NH and the voltage of the second output node NO2, which is configured to detect the current of the second high-side transistor HSM2. A first low-side amplifier LSA1 receives the voltage of the first output node NO1 and the voltage of the low-voltage node NL, which is configured to detect the current of the first low-side transistor LSM1. The second low-side amplifier LSA2 receives the voltage of the second output node NO2 and the voltage of the low-voltage node NL, which is configured to detect the current of the second low-side transistor LSM2.

Although the first current-detecting resistor RF1 and the second current-detecting resistor RF2 are able to detect the current, they consume power. In addition, the first high-side amplifier HSA1, the second high-side amplifier HSA2, the first low-side amplifier LSA1, and the second low-side amplifier LSA2 should be operated under the supply voltage VS, such that an unacceptable circuit area would be occupied by each of the first high-side amplifier HSA1, the second high-side amplifier HSA2, the first low-side amplifier LSA1, and the second low-side amplifier LSA2. Therefore, a short-circuit detection circuit is required to precisely detect whether a short circuit happens without influencing the circuit performance and occupying too much circuit area.

Figure 3:
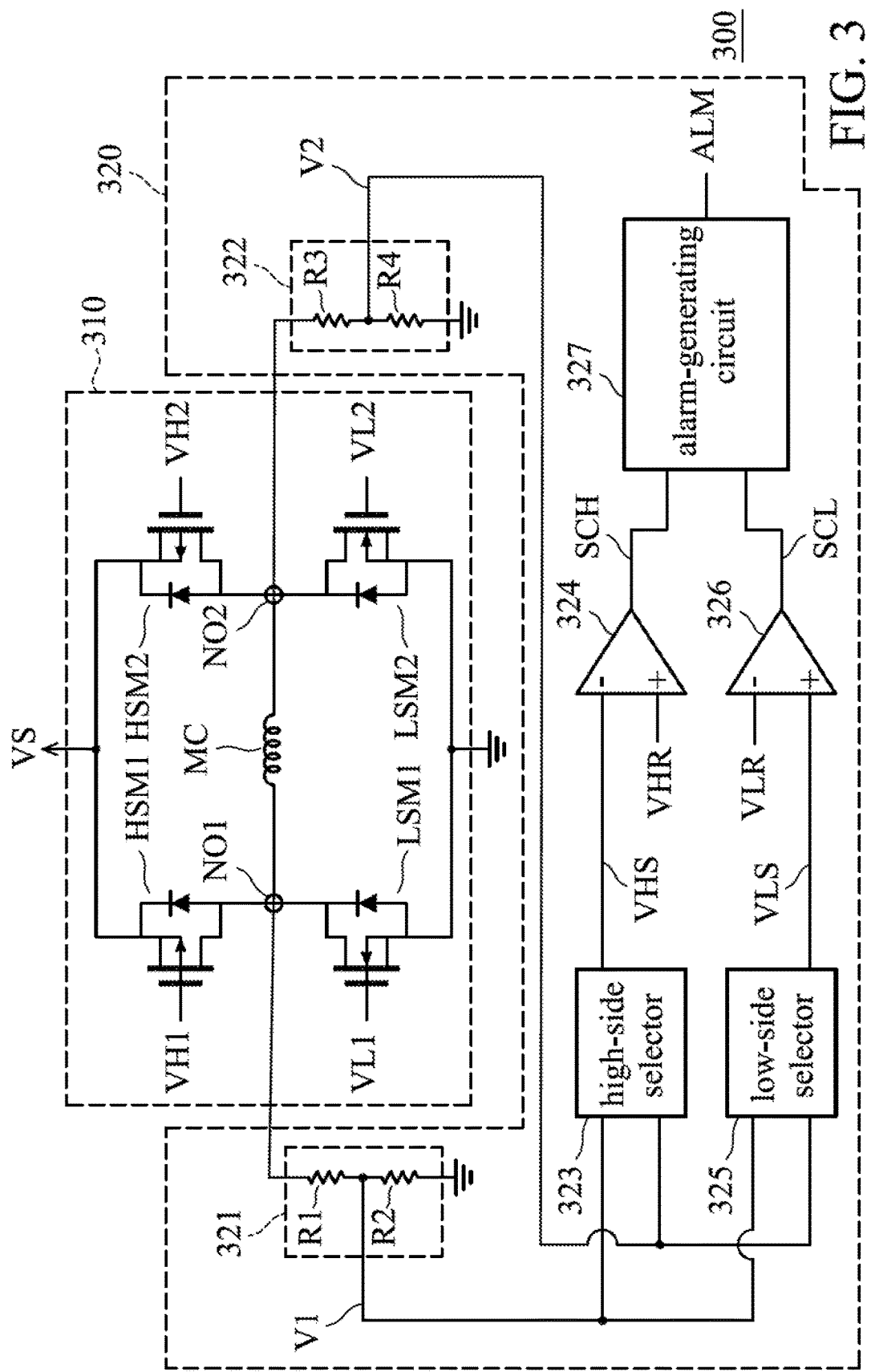
FIG. 3 is a schematic diagram of a full-bridge circuit in accordance with another embodiment of the invention.

FIG. 3 is a schematic diagram of a full-bridge circuit in accordance with another embodiment of the invention. As shown in FIG. 3, the full-bridge circuit 300 includes a full-bridge driving circuit 310 and a short-circuit detection circuit 320. The full-bridge driving circuit 310 is identical to the full-bridge circuit 100 in FIG. 1, which includes the first high-side transistor HSM1, the second high-side transistor HSM2, the low-side transistor LSM1, the second low-side transistor LSM2, and the motor coil MC. In addition, the full-bridge driving circuit 310 is also coupled between the supply voltage VS and the ground.

The first high-side transistor HSM1 provides the supply voltage VS to the first output node NO1 according to the first high-side driving voltage VH1. The second high-side transistor HSM2 provides the supply voltage VS to the second output node NO2 according to the second high-side driving voltage VH2. The first low-side transistor LSM1 electrically connects the first output node NO1 to the ground according to the first low-side driving voltage VL1. The second low-side transistor LSM2 electrically connects the second output node NO2 to the ground according to the second low-side driving voltage VL2.

The short-circuit detection circuit 320 includes a first voltage divider 321, a second voltage divider 322, a high-side selector 323, a high-side comparator 324, a low-side selector 325, a low-side comparator 326, and an alarm-generating circuit 327. The first voltage divider 321 is configured to receive the voltage of the first output node NO1 to generate the first voltage V1, which includes the first resistor R1 and the second resistor R2. The first resistor R1 is coupled between the first output node NO1 and the first voltage V1, and the second resistor R2 is coupled between the first voltage V1 and the ground. According to an embodiment of the invention, the resistance of the first resistor R1 is N times of the second resistor R2, in which N may be any positive integer and the first voltage V1 is less than the voltage of the first output node NO1.

The second voltage divider 322 is configured to receive the voltage of the second output node NO2 to generate the second voltage V2, which includes a third resistor R3 and a fourth resistor R4. The third resistor R3 is coupled between the first output node NO1 and the second voltage V2, and the fourth resistor R4 is coupled between the second voltage V2 and the ground. According to an embodiment of the invention, the resistance of the third resistor R3 is N times of the resistance of the fourth resistor R4, in which N may be any positive integer and the second voltage V2 is less than the voltage of the second output node NO2.

The high-side selector 323 is configured to select the first voltage V1 or the second voltage V2 to generate the high-side voltage VHS. According to an embodiment of the invention, when the first high-side transistor HSM1 is turned ON, the high-side selector 323 selects the first voltage V1 to be the high-side voltage VHS; when the second high-side transistor HSM2 is turned ON, the high-side selector 323 selects the second voltage V2 to be the high-side voltage VHS. According to another embodiment of the invention, the high-side selector 323, according to the first high-side driving voltage VH1, selects the first voltage V1 to be the high-side voltage VHS; the high-side selector 323, according to the second high-side driving voltage VH2, selects the second voltage V2 to be the high-side voltage VHS.

The negative input terminal of the high-side comparator 324 receives the high-side voltage VHS, and the positive input terminal of the high-side comparator 324 receives the high-side reference voltage VHR, so that the high-side comparator 324 compares the high-side voltage VHS with the high-side reference voltage VHR. When the high-side voltage VHS is less than the high-side reference voltage VHR, the high-side comparator 324 generates the high-side short-circuit signal SCH immediately.

The low-side selector 325 is configured to select the first voltage V1 or the second voltage V2 to generate the low-side voltage VLS. According to an embodiment of the invention, when the first low-side transistor LSM1 is turned ON, the low-side selector 325 selects the first voltage V1 to be the low-side voltage VLS; when the second low-side transistor LSM2 is turned ON, the low-side selector 325 selects the second voltage V2 to be the low-side voltage VLS. According to another embodiment of the invention, the low-side selector 325, according to the first low-side driving voltage VL1, selects the first voltage V1 to be the low-side voltage VLS; the low-side selector 325, according to the second low-side driving voltage VL2, selects the second voltage V2 to be the low-side voltage VLS.

The positive input terminal of the low-side comparator 326 receives the low-side voltage VLS, and the negative input terminal of the low-side comparator 326 receives the low-side reference voltage VLR, so that the low-side comparator 326 compares the low-side voltage VLS with the low-side reference voltage VLR. When the low-side voltage VLS exceeds the low-side reference voltage VLR, the low-side comparator 326 generates the low-side short-circuit signal SCL immediately.

The alarm-generating circuit 327 is configured to receive the high-side short-circuit signal SCH and the low-side short-circuit signal SCL. When the alarm-generating circuit 327 receives the high-side short-circuit signal SCH or the low-side short-circuit signal SCL, the alarm signal ALM is immediately generated. According to an embodiment of the invention, the alarm-generating circuit 327 may be an OR gate.

According to an embodiment of the invention, when the motor coil MC is short-circuited, the alarm-generated circuit 327 receives the high-side short-circuit signal SCH or the low-side short-circuit signal SCL to generate the alarm signal ALM.

According to another embodiment of the invention, when the motor coil MC is short-circuited to the supply voltage VS, the alarm-generating circuit 327 receives the low-side short-circuit signal SCL to generate the alarm signal ALM.

According to another embodiment of the invention, when the motor coil MC is short-circuited to the ground, the alarm-generating circuit 327 receives the high-side short-circuit signal SCH to generate the alarm signal ALM.

Comparing the full-bridge circuit 300 with the full-bridge circuit 200, the first current-detecting resistor RF1 and the second current-detecting resistor RF2 are removed from the full-bridge circuit 300 for reducing the unnecessary power consumption. In addition, the voltages of the first output node NO1 and the second output node NO2 are respectively divided by the first voltage divider 321 and the second voltage divider 322 to be the first voltage V1 and the second voltage V2, such that the short-circuit detection circuit 320 can be constituted by the low-voltage devices. Comparing the short-circuit detection circuit 320 with the short-circuit detection circuit 220, the required circuit area is greatly reduced.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A short-circuit detection circuit adapted in a full-bridge driving circuit, wherein the full-bridge driving circuit comprises a first high-side transistor coupled between a supply voltage and a first output node, a second high-side transistor coupled between the supply voltage and a second output node, a first low-side transistor coupled between the first output node and a ground, a second low-side transistor coupled between the second output node and the ground, and a motor coil coupled between the first output node and the second output node, comprising:
   a first voltage divider, dividing a voltage difference between the first output node and the ground to generate a first voltage;
   a second voltage divider, dividing a voltage difference between the second output node and the ground to generate a second voltage;
   a high-side selector, selecting the first voltage or the second voltage to generate a high-side voltage;
   a high-side comparator, generating a high-side short-circuit signal when the high-side voltage is less than a high-side reference voltage;
   a low-side selector, selecting the first voltage or the second voltage to generate a low-side voltage; and
   a low-side comparator, generating a low-side short-circuit signal when the low-side voltage exceeds a low-side reference voltage.

2. The short-circuit detection circuit of claim 1, wherein the first voltage divider comprises a first resistor and a second resistor, wherein the first resistor is coupled between the first output node and the first voltage, and the second resistor is coupled between the first voltage and the ground, wherein the second voltage divider comprises a third resistor and a fourth resistor, wherein the third resistor is coupled between the second output node and the second voltage, and the fourth resistor is coupled between the second voltage and the ground.

3. The short-circuit detection circuit of claim 1, wherein the first high-side transistor is turned ON according to a first high-side driving signal, and the second high-side transistor is turned ON according to a second high-side driving signal, wherein the high-side selector, according to the first high-side driving signal, selects the voltage of the first output node to be the first high-side voltage, and the high-side selector, according to the second high-side driving signal, selects the voltage of the second output node to be the high-side voltage.

4. The short-circuit detection circuit of claim 3, wherein the first low-side transistor is turned ON according to a first low-side driving signal, and the second low-side transistor is turned ON according to a second low-side driving signal, wherein the low-side selector, according to the first low-side driving signal, selects the voltage of the first output node to be the low-side voltage, and the low-side selector, according to the second low-side driving signal, selects the voltage of the second output node to be the low-side voltage.

5. The short-circuit detection circuit of claim 4, further comprising:
   an alarm-generating circuit, generating an alarm signal when the high-side short-circuit signal or the low-side short-circuit signal is received.

6. The short-circuit detection circuit of claim 5, wherein when the motor coil is short-circuited, the alarm-generating circuit receives the high-side short-circuit signal or the low-side short-circuit signal to generate the alarm signal, wherein
   when the motor coil is short-circuited to the supply voltage, the alarm-generating circuit receives the low-side short-circuit signal to generate the alarm signal, wherein
   when the motor coil is short-circuited to the ground, the alarm-generating circuit receives the high-side short-circuit signal to generate the alarm signal.

7. A full-bridge circuit, comprising:
   a full-bridge driving circuit, comprising:
      a first high-side transistor, coupled between a supply voltage and a first output node;
      a second high-side transistor, coupled between the supply voltage and a second output node;
      a first low-side transistor, coupled between the first output node and a ground;
      a second low-side transistor, coupled between the second output node and the ground; and
      a motor coil, coupled between the first output node and the second output node; and
   a short-circuit detection circuit, comprising:
      a first voltage divider, dividing the voltage difference between the first output node and the ground to generate a first voltage;
      a second voltage divider, dividing the voltage difference between the second output node and the ground to generate a second voltage;
      a high-side selector, selecting the first voltage or the second voltage to generate a high-side voltage;
      a high-side comparator, generating a high-side short-circuit signal when the high-side voltage is less than a high-side reference voltage;
      a low-side selector, selecting the first voltage or the second voltage to generate a low-side voltage; and
      a low-side comparator, generating a low-side short-circuit signal when the low-side voltage exceeds a low-side reference voltage.

8. The full-bridge circuit of claim 7, wherein the first voltage divider comprises a first resistor and a second resistor, wherein the first resistor is coupled between the first output node and the first voltage, and the second resistor is coupled to the first voltage and the ground, wherein the second voltage divider comprises a third resistor and a fourth resistor, wherein the third resistor is coupled between the second output node and the second voltage, and the fourth resistor is coupled between the second voltage and the ground.

9. The full-bridge circuit of claim 7, wherein the first high-side transistor is turned ON according to a first high-side driving signal, and the second high-side transistor is turned ON according to a second high-side driving signal, wherein the high-side selector, according to the first high-side driving signal, selects a voltage of the first output node to be the high-side voltage, and the high-side selector, according to the second high-side driving signal, selects the voltage of the second output node to be the high-side voltage.

10. The full-bridge circuit of claim 9, wherein the first low-side transistor is turned ON according to a first low-side driving signal, and the second low-side transistor is turned ON according to a second low-side driving signal, wherein the low-side selector, according to the first low-side driving signal, selects the voltage of the first output node to be the low-side voltage, and the low-side selector, according to the second low-side driving signal, selects the voltage of the second output node to be the low-side voltage.

11. The full-bridge circuit of claim 10, wherein the short-circuit detection circuit further comprises:
an alarm-generating circuit, generating an alarm signal when receiving the high-side short-circuit signal or the low-side short-circuit signal.

12. The full-bridge circuit of claim 11, wherein
when the motor coil is short-circuited, the alarm-generating circuit receives the high-side short-circuit signal or the low-side short-circuit signal to generate the alarm signal, wherein
when the motor coil is short-circuited to the supply voltage, the alarm-generating circuit receives the low-side short-circuit signal to generate the alarm signal, wherein
when the motor coil is short-circuited to the ground, the alarm-generating circuit receives the high-side short-circuit signal to generate the alarm signal.

* * * * *